United States Patent [19]

Jellinek

[11] 4,055,750

[45] Oct. 25, 1977

[54] HEADING SENSOR FOR VEHICLE DEAD RECKONING SYSTEM

[75] Inventor: Ernest Jellinek, Haddonfield, N.J.

[73] Assignee: RCA Corporation, New York, N.Y.

[21] Appl. No.: 694,043

[22] Filed: June 7, 1976

[51] Int. Cl.² ............................................... G06F 15/50
[52] U.S. Cl. .............................. 364/424; 116/35 R; 340/24
[58] Field of Search ........... 235/150.2, 150.24, 150.26, 235/150.27; 340/22, 23, 24; 116/124 R, 35 R; 73/505, 178 R

[56] References Cited

U.S. PATENT DOCUMENTS

| | | | |
|---|---|---|---|
| 3,681,752 | 8/1972 | Cuddihy | 340/24 |
| 3,789,198 | 1/1974 | Henson et al. | 340/24 X |
| 3,845,289 | 10/1974 | French | 235/150.2 X |
| 3,947,807 | 3/1976 | Tyler et al. | 340/23 |
| 3,961,166 | 6/1976 | Stobart | 340/24 X |

Primary Examiner—Joseph F. Ruggiero
Attorney, Agent, or Firm—H. Christoffersen; Joseph D. Lazar; Raymond E. Smiley

[57] ABSTRACT

A two-odometer heading sensor wherein an accumulator is incremented or decremented in response to detected increments of turn angle. Provisions are disclosed for avoiding errors due to spurious differences in the distance sensed by the respective odometers.

10 Claims, 1 Drawing Figure

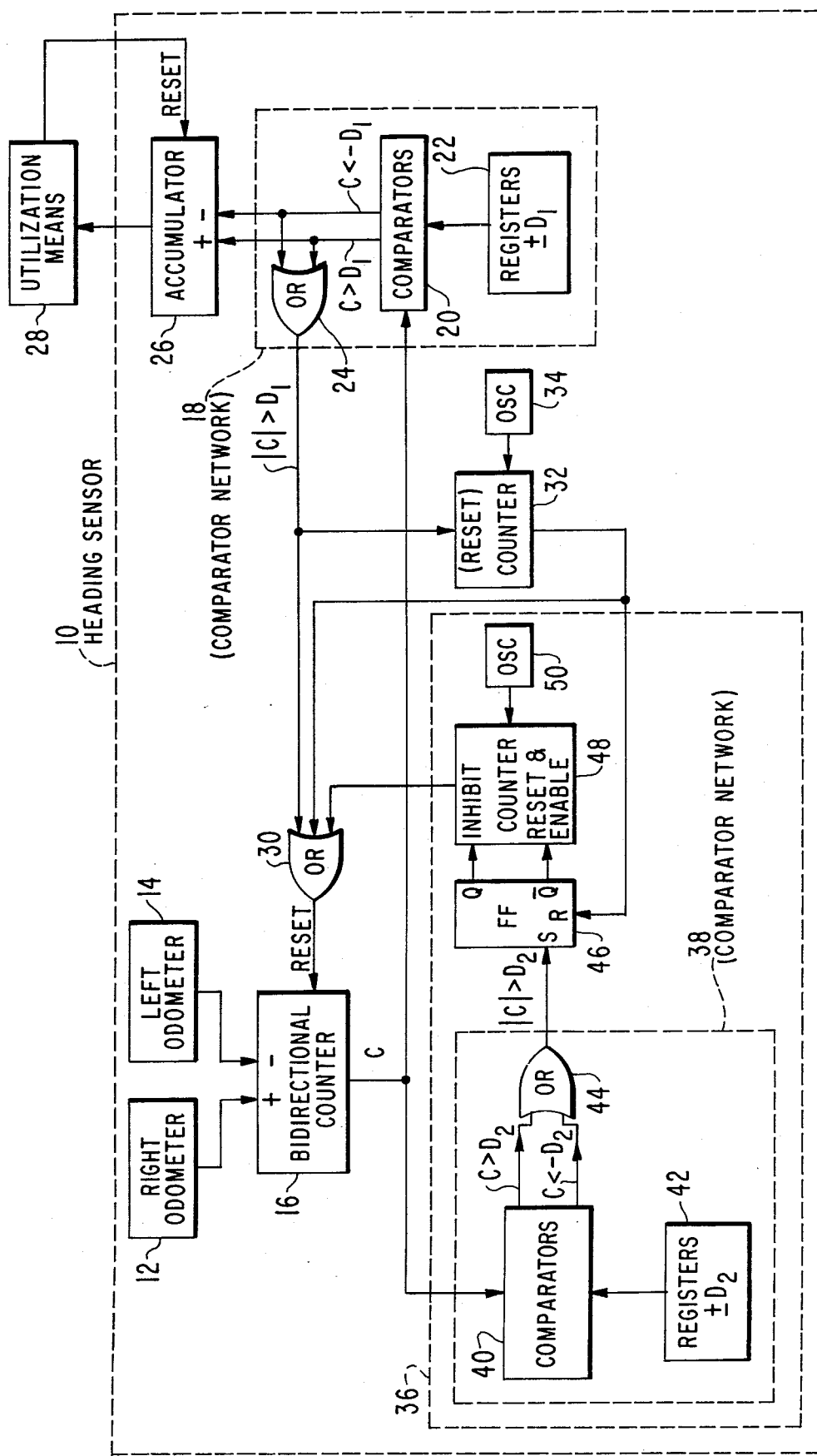

HEADING SENSOR FOR VEHICLE DEAD RECKONING SYSTEM

CROSS-REFERENCES TO RELATED APPLICATIONS

Of interest is copending application Ser. No. 694,042 filed by the present inventor on June 7, 1976, entitled "System for Automatic Vehicle Location" and assigned to the same assignee as is the present invention.

BACKGROUND OF THE INVENTION

1. Field of the Invention

The present invention relates to heading sensors, and in particular to heading sensors for use in automatic vehicle location systems.

2. Description of the Prior Art

Vehicle location monitors often utilize heading sensors to determine the heading of a vehicle with respect to a reference direction. Heading sensors generally utilize a magnetic compass or inertial sensors. However, magnetic compass sensors are subject to errors caused by magnetic field anomalies resulting from buildings, bridges, and other vehicles. Inertial type heading sensors are typically too expensive for large scale use in automotive vehicle location systems. In addition, various systems utilize "resettable relative heading sensors" wherein heading is determined with respect to a reference direction which is periodically changed. One such system is described in the aforementioned copending application Ser. No. 694,042. Compass and inertial type heading sensors are disadvantageous for use as resettable relative heading sensors because relative heading sensors utilizing compass or inertial type sensors require additional digital logic circuitry to determine and store the reference direction.

Heading sensors, utilizing essentially digital components, wherein the heading with respect to the reference direction is determined from the difference in distance traveled by laterally aligned wheels (hereinafter "lateral wheels"), for example, the right and left front wheels, are well known in the art. Such systems are hereinafter referred to as "two odometer systems." Briefly, two odometer systems operate on the principle that during a turn by the vehicle the lateral wheels of the vehicle follow circular paths about a common center of curvature, with the respective radii of the paths differing by the distance ($W$) between the wheels. The difference in distance ($\Delta D$) traveled by the respective wheels is expressed mathematically as follows:

$$\Delta D = \frac{2\pi W \Delta \theta}{360} \quad (1)$$

where $\Delta\theta$ is the angular amount of turn in degrees. Accordingly, the angular amount of turn is mathematically expressed as:

$$\Delta\theta = \frac{360 \Delta D}{2\pi W} \quad (2)$$

A description of one such two odometer system is found in "Urban Vehicle Monitoring: Technology, Economics, & Public Policy" Vol. II: Technical Analysis & Appendices, Final Report. prepared by Teknekron Inc., for the U.S. Department of Housing and Urban Development under Contract H-1030, Oct. 31, 1970. The Teknekron two odometer system utilizes the total accumulated difference in distance traveled by the respective wheels to represent the instantaneous heading of the vehicle. Thus, the distance difference is continuously integrated to produce a signal indicative of the instantaneous heading. Such a system is disadvantageous in that small heading errors due to, for example, differences in wheel circumferences, and lane changes, are cumulative.

Another two odometer system is described in U.S. Pat. No. 3,845,289 issued Oct. 29, 1974 to French et al. The French et al. system, however, operates only to indicate that a turn through an angle beyond a predetermined threshold value has been made by the vehicle and the direction (right or left) of such turn. No provision is made for determining the angle turned through by the vehicle.

SUMMARY OF THE INVENTION

The present invention provides an improved two odometer heading sensor. Quantizing means generates output signals indicative of the instantaneous polarity of the accumulated distance difference when the magnitude of the accumulated distance difference reaches a first predetermined threshold value. The quantizing means output signals are utilized to reset the accumulated distance difference to zero and further are applied to accumulator means. The accumulator means generates a signal indicative of the accumulated algebraic sum of the polarity signals. The accumulated distance difference is also reset to zero when the average rate of accrual of increments of distance difference over a first predetermined time period does not exceed a first predetermined rate of accrual, and is also reset to zero when the average rate of accrual of distance difference increments over a second predetermined time period, less than or equal to the first time period, does not exceed a second predetermined rate.

BRIEF DESCRIPTION OF THE DRAWING

The sole FIGURE of the drawing is a block diagram of a heading sensor in accordance with the present invention.

DESCRIPTION OF A PREFERRED EMBODIMENT

Referring to the drawing, a heading sensor 10, in accordance with the present invention is coupled to a cooperating vehicle (not shown) having a major longitudinal axis and minor transverse axis. Left and right odometers, 12 and 14 are deployed on the vehicle such that they generate output signals indicative of the distance traveled by, for example, the right and left front wheels. Odometers 12 and 14 are conventional odometers which generate a pulse for each predetermined increment (i) of distance traveled by the respective wheels. It should be appreciated that odometers 12 and 14 may measure the respective distances traveled by any two laterally aligned points on the vehicle. The terms "laterally aligned points" or "lateral points," are herein defined as meaning that the points are on the same side of the transverse axis of the vehicle and are positioned at substantially the same distance from the transverse axis. Odometers 12 and 14 are respectively coupled to the increment and decrement input terminals of a conventional bidirectional counter 16. The contents of bidirectional counter 16, are indicative of the difference in distance traveled by the respective wheels, as will be explained, and will hereinafter be referred to as the differential count C.

Count C is applied to a first comparator network 18 for generating an output signal when the magnitude of the differential count exceeds the magnitude of a predetermined threshold value $D_1$ as will be explained. Comparator network 18 is sometimes hereinafter referred to as "quantizing means" 18 and comprises conventional components: comparator 20, preset registers 22 and a two input OR gate 24. Comparators 20, receptive of differential count C from bidirectional counter 16 and signals indicative of plus and minus $D_1$ from preset registers 22, generate signals respectively indicative of when count C is greater than plus $D_1$ ($C > D_1$) and when count C is less (more negative) than minus $D_1$ ($C < -D_1$). Comparators (20) output signals are applied to the respective input terminals of OR gate 24.

Comparators (20) output signals are also applied to the increment or decrement terminals of a conventional accumulator 26, such as a bidirectional counter. Accumulator 26 is coupled to suitable utilization means 28, such as described in the aforementioned copending application Ser. No. 694,042. Accumulator 26 serves as the "heading register" of the dead reckoning system described in the aforementioned copending application. The output of OR gate 24 is applied to one input terminal of a conventional three input OR gate 30 and to the reset terminal of a conventional preset counter 32. The output terminal of OR gate 30 is coupled to the reset terminal of bidirectional counter 16. Preset counter 32 is continually clocked by a free running oscillator 34 and generates an output signal when its contents reach a predetermined count, thereby indicating the passage of a first predetermined time period $t_1$. The output signals of counter 32 are applied to a second input terminal of OR gate 30 and to the reset (R) terminal of a conventional R.S. flip flop 46, hereinafter described.

Differential count C is also applied to means 36 for generating an output signal if the magnitude of the differential count does not reach a second predetermined threshold value $D_2$ within a second predetermined time period $t_2$. Second threshold value $D_2$ and time period $t_2$ are respectively typically less than or equal to $D_1$ and $t_1$. Specifically, differential count C is applied to a second comparator network, generally indicated as 38, which generates an output signal whenever the magnitude of count C is greater than the magnitude of a predetermined threshold value $D_2$. Comparator network 38 comprises conventional components similar to components 20, 22 and 24 of comparator network 18, viz., comparators 40, preset registers 42 and two input OR gate 44 respectively. Comparators 40, receptive of differential count C from bidirectional counter 16 and signals indicative of plus and minus threshold value $D_2$ from registers 42, generate signals respectively indicative of the condition when count C is greater than plus $D_2$ (i.e. $C > D_2$) and the condition when count C is less (more negative) than minus $D_2$ (i.e. $C < -D_2$). Comparators (40) output signals are applied to OR gate 44 which generates a signal indicative of when the magnitude of count C is greater than the magnitude of threshold value $D_2$. The output signal of comparator network 38 is applied to the set input terminal (S) of RS flip flop 46, the reset terminal (R) of flip flop 46 being receptive of the output signal of counter 32 as described above. Flip flop 46 is preferably of the type responsive to positive going transitions applied to the set (S) and reset (R) input terminals thereof. The Q and $\overline{Q}$ output terminals of flip flop 46 are respectively coupled to the inhibit and reset start terminals of a conventional preset counter 48. Preset counter 48 is continually clocked by a free running oscillator 50 and generates an output signal when its contents reach a predetermined count, thereby indicating the passage of second predetermined time period $t_2$. The output signal of counter 48 is applied to the third input terminal of OR gate 30.

In the operation of heading sensor 10, odometers 12 and 14 generate pulses for each predetermined increment ($i$) of distance traveled by the respective right and left front wheels of the vehicle. The difference in distance ($\Delta D$) traveled by the respective wheels is thus equal to the difference in the number of pulses generated by odometers 12 and 14 times the predetermined distance increment ($i$) represented by each pulse. Since bidirectional counter 16 is incremented by pulses from odometer 12 and decremented by pulses from odometer 14, differential count C is equal to the difference in the number of pulses generated by the odometers (12, 14) and is therefore indicative of the difference in distance traveled by the respective wheels. Accordingly, count C is related to the angular amount of turn of the vehicle from a reference direction defined by a zero count in counter 16 in accordance with the following equation:

$$\Delta \theta = ( \frac{360\, i}{2\pi\, W} )C \qquad (3)$$

The polarity of differential count C is indicative of the direction of the turn. Distance increment $i$ can be chosen with respect to separation $W$, such that each discrete differential count can be made to represent any convenient quantum of angle.

However, if the heading of the vehicle were determined on the basis of a continuously accumulated distance difference, errors would accumulate due to spurious distance differences. Thus, it is desirable to obtain a separate change of heading determination for each actual turn (heading change) made by the vehicle and to ignore distance differences due to reasons other than actual heading changes.

In accordance with the present invention, heading sensor 10 operates on a quantized basis, to facilitate separate determinations of heading change for each turn by the vehicle. Comparator network 18 operates to increment or decrement accumulator 26 in accordance with the polarity of differential count C and to reset counter 16 each time the magnitude of count C exceeds first predetermined threshold value $D_1$. Specifically, comparators 20 output signals are respectively utilized to increment or decrement accumulator 26, and are further utilized by OR gate 24 to generate a signal whenever the magnitude of count C is greater than threshold value $D_1$ for resetting counter 16. Thus, each time the vehicle turns through an angle corresponding to a differential count C equal to threshold value $D_1$, accumulator 26 is incremented or decremented in accordance with the direction of the turn, and bidirectional counter 16 is reset to zero. The contents of accumulator 26 are therefore indicative of the instantaneous heading of the vehicle with respect to the heading of the vehicle when accumulator 26 was last set to zero. The angle of each turn made by the vehicle is thus measured in terms of predetermined increments or quantums of angle. As described in the aforementioned copending application Ser. No. 694,042 accumulator 26 may be reset by utilization means 28 to effect a change in reference direction.

In order to make separate determinations for each turn made by the vehicle, it is necessary to define the beginning and end of each turn, between which times a measure of the distance difference is taken to derive the angle of turn. In addition, spurious distance differences due to, for example, lane changes by the vehicle or, in the case of wheel odometers, differences in the circumference of the wheels, should for accuracy be omitted from the final determination of heading. For this purpose, in accordance with the present invention, it is presumed that during actual turns (changes in heading) by the vehicle, differential counts (C) are accrued at a rate greater than a predetermined minimum rate. Accordingly, differential counts accumulated at rates less than the predetermined minimum are spurious, not due to an actual change in heading of the vehicle, and are not reflected in the contents of accumulator 26. As explained in more detail below, such minimum "turn rate" is defined by threshold value $D_2$ and predetermined time period $t_2$.

In accordance with the present invention, means 36 operates to reset bidirectional counter 16 to zero if differential count c does not exceed predetermined threshold value $D_2$ within predetermined time period $t_2$ to avoid thereby errors due to the above-mentioned spurious distance differences. As noted above, counter 48 generates, unless inhibited, a signal indicative of the passage of second predetermined time period $t_2$, such signal being utilized to reset counter 16. Counter 48, is inhibited, however, by comparator network 38 and flip flop 46 when the magnitude of count C exceeds the magnitude of $D_2$. Time period $t_2$ and threshold value $D_2$ are chosen such that the quotient of $D_2$ divided by $t_2$ is equal to the predetermined minimum rate. Thus, counter 48 generates a signal to reset counter 16 only when differential counts are not accrued at a rate exceeding the predetermined minimum rate. Specifically, when the magnitude of count C exceeds threshold value $D_2$ a positive-going transition occurs in the output signal of comparator network 38, causing flip flop 46 to set and generate a Q output signal to inhibit counter 48. Thus, when the rate of accrual of differential counts exceeds the predetermined minimum rate, the magnitude of count C exceeds threshold value $D_2$ prior to counter 48 accumulating the predetermined count, counter 48 is inhibited, and bidirectional counter 16 is not reset. However, when the rate of accrual of differential counts is less than the minimum rate, count C remains below $D_2$ for longer than predetermined period $t_2$, counter 48 is not inhibited prior to reaching the predetermined count and a signal is generated to reset bidirectional counter 16. The above-described sequence is hereinafter referred to as the "turn detecting cycle."

It should be appreciated that the rate of accrual of differential count (C) is also a function of the vehicle speed, and that for additional rejection of spurious distance differences, threshold value $D_2$ may be automatically varied in accordance with the speed of the vehicle or ranges of vehicle speed. In such instance suitable logic circuitry, responsive to a signal representative of the vehicle speed, would preset registers 42 to respective values related to the vehicle speed. Similarly, time period $t_2$ could be varied in accordance with the speed of the vehicle.

The end of a given turn is determined by detecting when the differential count does not attain threshold value $D_1$ within first predetermined period $t_1$. The values of $D_1$ and $t_1$ are preferably chosen such that the quotient of $D_1$ divided by $t_1$ is equal to the predetermined minimum rate of accumulation of differential counts. It should be appreciated however, that a threshold rate different from that used to define the turn beginning may be used. Specifically, counter 32 is continually clocked by oscillator 34 and generates a signal to reset counter 16 and flip flop 46 upon reaching a predetermined count. Flip flop 46, when reset, resets and enables counter 48. Counter 32, however, is reset whenever the magnitude of the differential count exceeds threshold value $D_1$. Thus, when the rate of accumulation of differential counts drops below the minimum level, the magnitude of differential count C does not exceed $D_1$ within the period defined by counter 32. Counter 32 accordingly generates a signal to reset counter 16 via OR gate 30 and enable counter 48 by resetting flip flop 46, and the above-described "turn detecting cycle" is thereby reinitiated.

As noted above, the contents of accumulator 26 are indicative of the instantaneous heading of the vehicle with respect to the direction the vehicle was traveling when the accumulator was last reset to zero. Each count in accumulator 26 is indicative of a predetermined quantum of angle turned through. The quantum of angle represented by each count in accumulator 26 is determined by the wheel spacing (W) of the vehicle, the distance ($i$) represented by each pulse of the odometer, and the value selected for threshold $D_1$. Where the system is to be used only in city streets, the quantum of angle can be relatively large. Intersections of city streets are typically of one of a relatively few number of angles. Accordingly, quantum counts representative of such typical intersection angles can be preset in a logic circuit (not shown) interposed between comparator network 18 and accumulator 26 and only cumulative counts representative of the preset angles be applied (in parallel) to accumulator 26. The quantum of angle represented by a differential count C equal to $D_1$ need only be small enough, for example 5° to 15°, to distinguish between the various preset angles.

A computerized map lookup table may be utilized to supply the proper angle at irregular intersections not of one of the typical angles. It should be noted that the amount of memory required in such map lookup is relatively small since the memory is required to hold only data representative of irregular intersections for which the quantized measurement of angle is insufficiently accurate. Alternatively, accumulator 26 may be reset to zero at irregular intersections to establish a new reference direction as described in the aforementioned copending application Ser. No. 694,042 by the present inventor. The lookup table or periodic resetting techniques may be used with or without the above-mentioned preset angle logic circuitry.

It should be noted that in some instances, it may be appropriate for threshold values $D_1$ and $D_2$ to be equal ($D_1=D_2$). In such instance, means 36 could be omitted. Accordingly, each time differential count C reaches $D_1$, accumulator 26 is incremented, and whenever count C does not reach $D_1$ within time period $t_1$, counter 16 is reset.

It should be further noted, that while various connections between the elements of the drawing are shown as single lines, they are not so shown in a limiting sense and, as is understood in the art, may comprise plural connections.

It should be appreciated from the foregoing description that the present invention provides for a particularly advantageous two odometer heading sensor, in that the angle of heading of the vehicle with respect to a reference direction is made without cumulative error, and errors due to spurious distance differences are avoided.

What is claimed is:

1. An apparatus for determining the heading of a vehicle with respect to a reference direction, said vehicle having a major longitudinal axis and a minor transverse axis, said system being of the type including first means for resettably generating a differential count indicative of the difference in distance traveled by first and second predetermined points on said vehicle, said differential count having a polarity in accordance with a predetermined convention, said first and second predetermined points being positioned at substantially equal distances from said transverse axis and separated by a predetermined distance in a direction parallel to said transverse axis; wherein the improvement comprises:

quantizing means, responsive to said differential count, for generating output signals when the magnitude of said differential count reaches a first predetermined threshold value; said quantizing means output signals being indicative of the instantaneous polarity of said differential count, and being applied to first means to reset said distance count to zero;

accumulator mans, responsive to said quantizing means output signals, for generating an output signal indicative of the accumulated algebraic sum of said polarity signals;

first resetting means, responsive to said differential count, for generating an output signal when the average rate of accrual of increments of said differential count over a first predetermined time period does not exceed a first predetermined rate of accrual; and second resetting means, responsive to said differential count for generating an output signal when the average rate of accrual of increments of said differential count over a second predetermined time period does not exceed a second predetermined rate of accrual; said second time period being no greater than said first time period, said first and second resetting means output signals being applied to said first means to reset said differential count to zero.

2. The apparatus of claim 1, wherein said second resetting means comprises:

second means, responsive to said differential count and control signals applied thereto, for generating an output signal when the magnitude of said differential count does not exceed a second predetermined threshold value within said second predetermined time period, said second means being inhibited if said second threshold value is reached.

3. The apparatus of claim 2, wherein said first resetting means comprises:

third means, responsive to said quantizing means output signal, for generating an output signal if the magnitude of said differential count does not exceed said first predetermined threshold value within said first predetermined time period, said third means output signal being applied as a control signal to said second means to re-enable said second means.

4. The apparatus of claim 3 wherein the ratio of said first predetermined threshold value to said first predetermined time period is equal to the ratio of said second predetermined threshold value to said second time period.

5. The apparatus of claim 4 wherein said first predetermined threshold value is equal to said second predetermined threshold value.

6. The apparatus of claim 3 wherein said third means comprises:

second counter means, responsive to said quantizing means input signals and incremented at a predetermined frequency, for generating an output signal when the contents thereof equal a second predetermined value; said counter means being reset by said quantizing means output signal;

said second counter means output signal being applied to said first means to reset said differential count to zero, and further being applied to said first counter means to re-enable said first counter means.

7. The apparatus of claim 2 wherein said second means comprises:

counter means, responsive to control signals applied thereto and incremented at a predetermined frequency, for generating an output signal when the contents thereof equal a first predetermined value, said counter means output signal being said second means ouput signal;

comparator means, responsive to said differential count, for generating an output signal when the magnitude of said differential count exceeds said second predetermined threshold value;

inhibiting means, responsive to said comparator means output signal, for generating a first control signal to said counter means to inhibit and reset said counter means in response to said comparator means output signal.

8. The apparatus of claim 1, wherein said first predetermined rate of accrual is equal to said second predetermined rate of accrual.

9. The apparatus of claim 1, wherein said second resetting means includes means for varying said second predetermined rate of accrual in accordance with the speed of said vehicle.

10. A method for determining the heading of a vehicle with respect to a reference direction comprising the steps of:

a. resettably generating a differential count indicative of the distance traveled by first and second laterally aligned points on said vehicle;

b. generating, in response to said differential count, a first reset signal when the magnitude of the differential count does not exceed a first predetermined threshold value within a predetermined period of time;

c. resetting said differential count to zero in response to said first reset signal;

d. generating, from said differential count, signals indicative of the instantaneous polarity of said differential count, when the magnitude of said differential count exceeds a second predetermined threshold value;

e. generating, in response to said polarity signals a count indicative of the algebraic sum of said polarity signals, said count being incremented in response to polarity signals indicative of one polarity and decremented in response to polarity signals indicative of the other polarity; and f. resetting said distance count to zero in response to said polarity signals.

* * * * *